United States Patent [19]

Bauchhenss

[11] Patent Number: 4,722,855

[45] Date of Patent: Feb. 2, 1988

[54] PROCESS FOR PAINTING SUBSTRATES IN WEB OR TABULAR FORM

[75] Inventor: Jürgen Bauchhenss, Dietzenbach-Steinberg, Fed. Rep. of Germany

[73] Assignee: Schramm Lacke GmbH, Offenbach, Fed. Rep. of Germany

[21] Appl. No.: 900,709

[22] Filed: Aug. 27, 1986

[30] Foreign Application Priority Data

Aug. 31, 1985 [DE] Fed. Rep. of Germany ....... 3531123

[51] Int. Cl.$^4$ .............................................. B05D 3/02
[52] U.S. Cl. ............................. 427/388.5; 427/385.5; 427/386; 524/478
[58] Field of Search ..................... 427/385.5, 386; 524/478

[56] References Cited

U.S. PATENT DOCUMENTS

| | | | |
|---|---|---|---|
| 3,014,811 | 12/1961 | Storck | 427/359 |
| 4,133,916 | 1/1979 | McGinniss | 427/385.5 |
| 4,163,673 | 8/1979 | Dechert | 524/487 |
| 4,371,634 | 2/1983 | Hoffman | 524/487 |
| 4,554,363 | 11/1985 | Petke et al. | 524/487 |
| 4,614,674 | 9/1986 | Lauterbach | 427/386 |

*Primary Examiner*—Thurman K. Page
*Assistant Examiner*—L. R. Horne
*Attorney, Agent, or Firm*—Howard M. Ellis; Michael L. Dunn

[57] ABSTRACT

A process for painting substrates in web or tabular form using roller application wherein a primer or base coat layer of paint and a top coat layer of paint are applied is characterized in that in the application of one of the two layers of paint a paint is used which contains in a solvent or dispersing agent a crosslinkable or thermoplastic resin which is liquid at the processing temperature, 0.5 to 7% by weight in relation to the dry weight of the resin of an organic substance which is suspended or emulsified in the solvent or dispersing agent, the size of the particles or droplets of said substance lying between 3 and 60 μm, said substance melting at the processing temperature and its surface differing from that of the resin, and where appropriate the conventional paint additives.

13 Claims, No Drawings

PROCESS FOR PAINTING SUBSTRATES IN WEB OR TABULAR FORM

In various fields of application, such as for example in the manufacture of housings for so-called "white goods", such as those for refrigerators and washing machines, it is desirable during painting to obtain not a smooth surface but to produce a surface structure since a smooth paint finish does not cover up small irregularities in the surface.

Up to now it has only been possible to obtain a surface structure of this kind in the finish by using a spraying process wherein thixotropic agents or silicons were added to the spraying paint which produce the desired pitted surface structure when the paint is stoved.

More recent developments made it possible to paint the metal sheets before moulding using roller application (coil coating) thus leading to considerable rationalisation in the manufacture of housings for "white goods" for example. However, it has only been possible previously to obtain smooth surfaces when painting by roller application since it is impossible to add thixotropic agents or silicons because the latter impeded the paint from flowing adequately during the rapid coil coating process or have a disruptive effect on the process cycle.

The problem underlying the invention was thus to evolve a process for painting materials such as metal sheets, in web or tabular form by means of roller application wherein a surface structure could be obtained which had previously only been attainable by spray painting with wet paint, powder or enamel. A further feature of the problem underlying the invention consists of being able to obtain by roller application painted materials in web or tabular form with improved physical properties. This problem is solved by the process according to the invention.

This process according to the invention for painting substrate materials in web or tabular form using roller application wherein a primer or base coat layer of paint and a top coat layer of paint are applied is characterised by the fact that in the application of one of the two layers of paint a paint is used which contains in a solvent or dispersing agent a crosslinkable or thermoplastic resin which is liquid at the processing temperature, 0.5 to 7% by weight in relation to the dry weight of the resin of an organic substance which is suspended or emulsified in the solvent or dispersing agent, the size of the particles or droplets of said substance lying between 3 and 60 $\mu$m, said substance melting at the processing temperature and its surface tension differing from that of the resin, and where appropriate the conventional paint additives.

Therefore, the process according to the invention offers two possible alternatives. It is either possible to apply to the substrate, such as sheet metal, firstly a base coat layer containing the suspended or emulsified organic substance whereby due to this organic substance the base coat layer produces a pitted surface structure with elevations and depressions which is distributed evenly over the surface of the substrate, a normal top coat layer then being applied thereupon and forming over the structured base coat layer a cohesive coating which assumes the surface structure of the base coat layer. In this way a surface structure is obtained which was previously obtainable for example in the case of so-called "white goods" by using the complicated spray painting process which could only be carried out with a relatively low production output.

The other possible alternative consists of first applying a smooth and cohesive base coat layer and then applying thereover a top coat layer containing the organic substance wherein the top coat layer produces the surface structure. Depending upon the choice of colours for the paint layers it is possible to obtain not only structured finishes but finishes with unusual colour effects which offer new aesthetic impressions. Thus, the base coat layer may be colourless or pigmented or contain metal bronzes in order to give a metallic effect. The surface layer of paint may also be a clear lacquer or a pigmented paint. Hence, depending upon the combination different optical effects are produced.

The surface structure obtainable in accordance with the invention is surprising and is derived from the differing surface tension or wettability of the organic substance on the one hand and the paint resin on the other hand. Furthermore, the pitted surface has the additional advantage of improved surface abrasion resistance. This can presumably be attributed to the fact that the painted surface comprises "hills" and "valleys" wherein the "hills" have a greater thickness than in other customary painting processes without increasing the total amount of paint required as compared with such customary processes. It is substantially exclusively the "hills" which are subjected to abrasion and they are able to withstand an attack of this kind for considerably longer than smooth layers of paint which do not contain the organic substance.

Furthermore, the physical and chemical properties of the paint layer are surprisingly in no way impaired by the addition of the organic substance as compared with normal paints with the result that the materials painted in accordance with the invention have an excellent alkali resistance and resistance to boiling water, high mechanical deformation properties, good resistance to cleaning agents, good surface hardness and good antifriction properties during thermoforming and deformation.

Thus the painting process according to the invention using roller application (Roller Coating or Coil Coating) can be used in many different technical fields where such properties and a paint finish with surface structure are desired. These fields include for example shelf construction, the manufacture of white goods (refrigerators, washing appliances), the manufacture of facings and housings of all kinds such as those of office machines, phonographic appliances, household appliances, office furniture, control cabinets and panels and the like. In general, the process according to the invention can be used in many cases where today spray painting processes are customary which has great economical significance with regard to the high production speed of the roller application process.

The base coat layer and the top coat layer of paint are expediently applied to a thickness which corresponds to a dry film thickness of from 5 to 40 $\mu$m, preferably from 5 to 30 $\mu$m and in particular from 10 to 20 $\mu$m.

In particular, in the case of the alternative wherein the organic substance is contained in the base coat layer of paint preferred dry film thicknesses lie between 10 and 20 $\mu$m (height of the "hills") for the base coat layer and between 20 and 25 $\mu$m for the top coat layer.

In the case of the alternative wherein the organic substance is contained in the top coat layer of paint preferred dry film thicknesses lie between 5 and 15 $\mu$m for the base coat layer and between 15 and 25 μm (height of the "hills") for the top coat layer.

The higher the dry film strength of the paint layer containing the organic substance and the greater the content of the organic substance within the above-mentioned range of from 0.5 to 7% by weight, the coarser the surface structure becomes. Conversely, finer structures are obtained with lower contents of the organic substance and lower dry film strengths of the paint layer containing this substance.

If one is speaking here of an organic substance suspended or emulsified in the solvent or dispersing agent then this substance can also be described as an interfering substance since it interferes with the formation of a smooth layer of paint. The kind of organic substances which may be used as interfering substances in the process according to the invention are liquids or solids which melt at the processing temperature. Liquids which may be considered are, for example, droplet-forming oils or greases and solids coming under consideration are polymers or in particular waxes. In the case of liquid interfering substances these do not need to be present in the paint beforehand in emulsified form with the given droplet sizes. It is sufficient for them to be separated in the form of fine droplets during heating, for example during the evaporation of solvent from the paint.

The preferred substance used as the organic interfering substance is a solid, as stated above expediently a wax.

The important factor is that the organic interfering substance and the resin contained in the paint each have a differing surface tension or wettability. As is customary the surface tension is understood as energy E per surface A to be produced. In the conventional way the surface tension is determined as the angle of contact with a pre-determined liquid, such as in the conventional manner distilled water. A contact angle of 0 means complete wetting and a contact angle of 180° no wetting. It is expedient for the surface tensions of the resin and the organic interfering substance to differ from one another, expressed as the angle of contact during wetting with distilled water, by at least 20°, preferably by at least 30° and particularly by at least 40°, measured for example by means of a contact angle measuring device ERMA Type G 1 manufactured by Krüss Wissenschaftliche Laborgeräte GmbH of Hamburg.

Preferred contents of the organic interfering substance in the liquid paint lie between 1 and 5% by weight, particularly between 1.5 and 4% by weight, in relation to the dry weight of the resin contained in the paint. Where the content of this substance is less than 0.5% by weight in relation to the dry weight of the resin the structured surface effect becomes too slight so that the appearance of the paint finish when completed approaches that of a smooth paint layer. Where the content is greater than 7% by weight related to the dry weight of the resin the structuring is too coarse and possibly uneven.

The sizes of the particles or droplets of the organic interfering substances suspended or emulsified in the paint lie between 3 and 60 μm. In the case of solid substances the particle sizes usually lie between 5 and 60 μm, preferably between 10 and 40 μm and there is usually a mixture of particles of differing sizes, the smallest of which however are not less than 3 μm and the largest do not exceed 60 μm.

When the organic interfering substance is a liquid at room temperature the droplet sizes are usually between 3 and 15 μm and preferably between 3 and 5 μm.

It is most advisable to use as the organic interfering substance a substance that is or becomes liquid below the curing or melting temperature of the resin. When using solid organic substances for this purpose their melting point lies expediently between 100° and 180° C., preferably between 130° and 160° C. The substances may dissolve partially in the paint system. In any event they must, as already mentioned, have the desired particle or droplet sizes at least during heating and they may not remain in genuine solution in the solvent or dispersing agent until curing or melting of the resin.

All conventional waxes may be considered per se as waxes for this process, preference being given however to synthetic waxes. In particular, consideration is given to modified or unmodified polyethylene waxes, polypropylene waxes and polyamide waxes. The waxes which can be used in accordance with the invention usually have a mean molecular weight (number average) of between 300 and 10,000, preferably between 500 and 5,000. Polyethylene waxes and polypropylene waxes are either polyethylene or polypropylene homopolymers or polyethylene or polypropylene copolymers with 0.5 to 40% by weight of co-monomer units which are derived from saturated or unsaturated mono-carboxylic acids or their amides. Examples of co-monomer units of this kind are the radicles of acrylic acid, methacrylic acid, maleic acid, fumaric acid, acrylamide, stearic acid or stearic acid amide. A specific example of a wax which can be used according to the invention is a polyethylene-bis-stearoyl amide wax.

All resins normally used in conventional paints may be considered as paint resins for this process. Examples include polyester resins, polyurethane resins, polyacrylate resins, alkyd resins, polyamide imide resins, polyamide resins, polysulphone resins or epoxy resins.

Preference is given to polyester resins and polyurethane resins which may be used for both layers of paint according to the invention.

In general the polyester resins comprise one or several aliphatic and/or cycloaliphatic multivalent and where appropriate in part monovalent alcohols and one or several aliphatic, cycloaliphatic and/or aromatic multivalent and where appropriate in part monovalent carboxylic acids and/or derivatives of the alcohols or carboxylic acids, such as esters or acid anhydrides. Examples of suitable alcohols or derivatives of the same are lauryl alcohol, benzyl alcohol, cyclohexanol, ethylene glycol, 1,2-propanediol, propylene oxide, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 2,4,4-trimethyl-1,6-hexanediol, 1,4-dimethylolcyclohexane, 2,2-bis-(4-hydroxycyclohexyl)-propane, 2,2-bis-(p-phenyleneoxyethanol)-propane, 2,2-bis-(p-phenyleneoxypropanol-2-)-propane, glycerine, glycidol, trimethylolethane, 1,1,1-trimethylolpropane, dimethylolpropionic acid, pentaerythritol and others. Consideration is also given to esterification products of dioles and polyoles such as for example di- and triethylene glycol, polyethylene glycol, di-, tri-, tetra- and penta-erythritol as well as the neopentyl glycol esters of hydroxypivalic acid. In particular this constituent consists of dioles or trioles having 2 to 8 carbon atoms.

Examples of suitable carboxylic acids or derivatives of the same are benzoic acid, branched or non-branched fatty acids, cycloaliphatic or aliphatic dicarboxylic acids such as maleic acid, fumaric acid, itaconic acid, citraconic acid, malic acid, succinic acid, glutaric acid, adipic acid, azelaic acid etc. or aromatic carboxylic acids such as o-phthalic acid, dichlorophthalic acid, isophthalic acid, terephthalic acid, dimethyl terephthalate, trimellitic acid and pyromellitic acid. Preference is given to aliphatic, cycloaliphatic or aromatic dicarboxylic or tricarboxylic acids with 4 to 10 carbon atoms.

The polyester resins are cured in the conventional manner using, for example, polymers containing hydroxyl groups. Examples of suitable curing agents contain m-methylol groups and/or n-methylol ether groups such as melamine resins, urea resins, n,n'-ethylene urea resins, dicyanamide and benzoguanamine.

A polyester resin which may be used favourably according to the invention is a saturated, oil-free polyester resin containing hydroxyl groups.

Another group of resins which are used expediently is the group of polyurethane resins. These comprise di- or polyisocyanates and hydroxyl functional binding agents, wherein the resins can also be formed in situ from a blocked di- or polyisocyanate and the hydroxyl functional binding agent.

Examples of suitable isocyanates are hexamethylene-diisocyanate, 2,2,4-trimethyl-1,6-hexane-diisocyanate, 2,4,4-trimethyl-1,6-hexane-diisocyanate, cyclohexyl-1,4-diisocyanate, isophoron-diisocyanate, the adduct of one molecule of 1,4-butanediol and two molecules of isophoron-diisocyanate or hexamethylene-diisocyanate, dicyclohexylmethane-4,4'-diisocyanate, 1,3,5-trimethyl-(2,4-w-diisocyanate methyl)-benzol, toluol diisocyanate with diphenylmethane-4,4'-diisocyanate etc. Hydroxyl functional binding agents to react with the isocyanate groups of the di- or polyisocyanates, which are blocked where appropriate, include for example polyester, polyole, polyether, polyurethane, polyacrylate, polyglycol, polyvinyl compounds, melamine resins, epoxy resins, urea resins or other polymers with hydroxyl groups, as well as compounds with active hydrogen atoms which may be bonded to both heteroatoms and carbon, such as for example polyaminoamide, amines etc. Preference is given to a polyester containing hydroxyl groups or an oxyester when selecting a hydroxyl functional binding agent.

When using blocked polyisocyanates the isocyanate groups may be blocked for example by an alcohol, by caprolactam, by a phenol or by a glycol. Blocked polyisocyanates which are particularly suitable are the combinations of the isophoron-diisocyanate which are blocked by caprolactam.

The paint resin is usually contained in the paint in an amount of from 10 to 60% by weight, preferably from 20 to 40% by weight.

In addition to the resin and the wax the paint also contains, of course, an organic solvent or dispersing agent, such as one from the group of aromatic or aliphatic hydrocarbons, esters, ethers, ketones, alcohols, etheralcohols or other liquid organic compounds, in which the paint resin or its precursor used in the paint system is dissolved.

Examples of suitable solvents are the ethyl ethers or butyl ethers of ethylene glycol acetate, isophoron, 2,2,4-trimethyl-1,3-pentanediol-isobutyrate, 2,2,4-trimethyl-1,3-pentanediol-diisobutyrate, cyclohexanone, dimethylglutarate, dimethylsebacate, dimethyladipate, the butyl ether of diglycol, n,n-dimethylformamide, n-methylpyrrolidone, propylene carbonate diisopropylbenzol. Generally most suitable are aromatic solvents, esters and glycols.

Besides the solvent, resin and wax the paints usually contain conventional paint additives such as pigments, metal bronzes, dyestuffs, fillers, anti-foaming agents, UV stabilizers, flow agents, plasticizers, gloss improving agents and hardening agents.

Conventional colour pigments are for example titanium dioxide (rutile), chromium oxide, nickel oxide, cobalt oxide and iron oxide, metallising pigments, such as aluminium bronze, and pigment dyestuffs which are heat-resistant and light resistant and weatherproof. The paints according to the invention may of course also be unpigmented in the form of so-called clear lacquers.

The resins used in the paints according to the invention may be crosslinkable or thermoplastic meltable resins.

The organic interfering substance must be present in liquid form at some point in time at the processing temperature. Since the processing temperatures during the application of the paint do not exceed a maximum of 350° C. or the substrate materials coated with paint are preferably heated to a temperature of from 210° to 260° C. the organic interfering substance must be able to be converted into the liquid state at maximum at these temperatures which are used since the desired surface structure is not obtained if the organic interfering substance does not melt but remains as granules embedded in the finished layer of paint.

It is expedient if the curing temperature in the case where crosslinkable resins are used and the melting temperature in the case where thermoplastic meltable resins are used is noticeably higher than the melting temperature of the organic interfering substance being used, such as that of the wax being used. For it is favourable in the process according to the invention for the interfering substance, such as the wax, to melt first before the resin present in admixture with the particles of this substance is cured or stoved or before the thermoplastic resin melts.

Thus, a particularly favourable manner of proceeding consists of slowly heating the substrate after the wet application of the layer of paint containing the organic interfering substance, of firstly at least predominantly evaporating the solvent or dispersing agent, and indeed expediently before the interfering substance melts, of then having the interfering substance melt before the resin is cured or melts for its part and wherein finally the resin is cured at the stoving temperature or the resin melts at its melting temperature as the case may be.

Where it is stated in connection with the invention that the resin should be liquid at the processing temperature then this is in turn intended to mean that this liquid state should occur at any time as the temperature is rising, in general in the upper region of the processing temperature range used. Liquid state means here either the melted state of the resin or the state of the resin when it is dissolved in the remaining solvent since both these possible liquid states permit the resin to flow well.

Crosslinkable paint resins such as those of the polyester or polyurethane type are preferably used. This applies to both the base coat layer and the top coat layer. Before the top coat layer is applied the base coat layer must be cured. It is however advisable prior to the application of the top coat layer to cure the base coat layer only incompletely in order to obtain a better bond between the two layers of paint.

EXAMPLE 1

Electrolytically galvanised steel plates having a thickness of 0.5 mm and pre-treated with Bonder 1303 (alkaline oxidation, Firma Metallgesellschaft) were painted with a pigmented priming coat of paint on the basis of a linear, saturated, oil-free polyester resin containing hydroxyl groups, a melamine resin and a proportion of wax in a squeegee winding-up process (spiral squeegee) and then stoved for 30 seconds in a tunnel oven at an oven temperature of from 260° to 280° C. and at a carrier material temperature (PMT) resulting therefrom of from 220° to 230° C. The dry film thickness was between 10 and 20 μm, i.e. the "valleys" of the structure formed (approx. 50% of the surface) had a thickness of approx. 5 to 10 μm and the "hills" approx. 20 to 25 μm. Hereupon the over-painting was carried out according to the same process (i.e. using a spiral squeegee) using a white-pigmented top coat paint based on polyurethane resin. Then the top coat layer of paint was stoved for 40 seconds in the tunnel oven at an oven temperature of from 260° to 280° C. and at a carrier material temperature (PMT) resulting therefrom of from 240° to 250° C. The dry film thickness was between 20 and 25 μm.

| Priming coat, structured, white | Parts by weight |
|---|---|
| linear, saturated, oil-free polyester resin containing hydroxyl groups (110%) | 25.0 |
| melamine resin (100%) | 5.0 |
| titanium dioxide (rutile) | 16.0 |
| zinc phosphate | 4.0 |
| blocked p-toluol sulphonic acid | 0.2 |
| aromatic hydrocarbon solvent (Boiling range 185 to 210° C.) | 19.0 |
| aromatic hydrocarbon solvent (Boiling range 230 to 290° C.) | 18.0 |
| diethyleneglycol monobutyletheracetate | 10.3 |
| ethyleneglycol monoethyletheracetate | 2.0 |
| polyethylene-bis-stearylamide wax | 0.5 |
| | 100.0 |

Running out viscosity = 100 sec. 4 mm DIN 53 211 20° C.

The aforesaid paints were manufactured according to the conventional method of paint manufacture, i.e. dispersing with a dissolver, grinding in a pearl mill, adjusting the viscosity with solvents. In the manufacture of the primer paint the wax was worked in with a dissolver.

Test plates coated in this way were tested according to the Coil Coating criteria:

TABLE I

| Degree of gloss | 80 units angle 60° acc. to Gardner |
|---|---|
| Cross-hatch adhesion test acc. to DIN 53 151: | Characteristic GT 0 |
| Abrasion resistance: Taber abraser GS 17 - Rollers 1000 g Load 500 U | <15 mg |
| Pencil hardness | H |
| Scratch hardness acc. to Wolf-Wilborn acc. to ECCA Standard: T4: | |
| Erichsen depth acc. to DIN 53 156: | <9 mm |
| Impact Test ASTM D 2794-69 | 80 inchpound = 0.03 Nm |

T-bend test acc. to ECCA Standard T 7: T 1–T 1.5 free of cracks
MEK test (methylethylketone): 100 double strokes with impregnated cotton plug

TABLE II

| Weather-O-Meter (Atlas) | |
|---|---|
| Cycle | 17:3 |
| carbon arc light | 1000 h o.k. |
| QUV test | 500 h 15% gloss decay slight yellowing no chalking |
| humid room climate acc. to DIN 50 017 SK: | 1000 h o.k. |
| Kesternich acc. to DIN 50 018: | 10 rounds slight formation of patches |
| salt spray test acc. to DIN 50 021 or ASTM B 117: | 500 h o.k. |
| water storage at 30° C. | 1000 h o.k. |
| Stability tests for washing appliances | |
| 1. Alkali test: | 1% lye e.g. Persil solution 2 × 5 h at 95° C. |
| 2. Boiling test: | water 4 × 5 h 95° C. |
| Recovery time of the test plates after each round 24 h at room temperature. | |
| After each round: | Lattice section Erichsen depth T bend test and penetration hardness acc. to Buchholz. |
| 3. Detergent test: | e.g. 0.5% Perovit solution in water 96 h at 60° C. |

The demands placed on washing appliances are thus satisfied.

EXAMPLE 2

Aluminium sheets (DIN symbol: ALMn 1 Mg 0.5, Firma Olbright & Wilson, 0.6 mm thickness, pre-treated with ACCOMET C (chromatization)), were painted with a pigmented priming coat based on a linear, saturated, oil-free polyester resin containing hydroxyl groups in combination with melamine resin in a squeegee winding-up process (spiral squeegee) and then stoved for 30 seconds in a tunnel oven at an oven temperature of from 260° to 280° C. and at a carrier material temperature (PMT) of from 230° to 240° C. The dry film thickness was between 8 and 10 μm. The paint surface obtained was smooth (without structure). Following the same process (i.e. spiral squeegee) a colourless (unpigmented) top coat based on polyurethane resin was applied on top of the stoved priming coat and then stoved in 40 seconds in the tunnel oven at an oven temperature of from 260° to 280° C. and at a carrier material temperature (PMT) resulting therefrom of from 240° to 250° C. The colourless top coat of paint used contains an amount of wax which causes an even surface structure to be formed. The dry film thickness was between 10 and 20 μm, i.e. the "valleys" of the structure formed (approx. 50% of the surface) had a thickness of approx. 5 to 10 μm, the "hills" approx. 20 to 25 μm.

| | Parts by weight |
|---|---|
| Priming coat, smooth, black | |
| linear, saturated, oil-free polyester resin containing hydroxyl groups 100% | 30.0 |
| melamine resin | 10.0 |
| epoxy resin | 2.0 |
| carbon black | 2.0 |
| delustering agent | 2.0 |
| blocked paratoluol sulphonic acid | 0.1 |
| aromatic hydrocarbon solvent (boiling range 185 to 210° C.) | 23.0 |
| ethyleneglycol monoethyletheracetate | 10.0 |
| diethyleneglycol monobutyletheracetate | 11.0 |
| | 100.0 |

Running out viscosity = 100 sec. 4 mm DIN 53 211 20° C.
Top coat, colourless, structured

|                                                                                                                                 | Parts by weight |
| ------------------------------------------------------------------------------------------------------------------------------- | --------------- |
| Caprolactam-blocked adduct of isophoron diisocyanate (IPDI) and oxyester containing hydroxyl groups (weight ratio: 23.4:36.6)   | 50.0            |
| dibutyl tin dilaurate (DBTL)                                                                                                    | 0.2             |
| aromatic hydrocarbon solvent (boiling range 185 to 210° C.)                                                                     | 25.0            |
| aromatic hydrocarbon solvent (boiling range 230 to 290° C.)                                                                     | 12.8            |
| ethyleneglycol monoethyletheracetate                                                                                            | 11.0            |
| polyethylene-bis-stearylamide wax                                                                                               | 1.0             |
|                                                                                                                                 | 100.0           |

Running out viscosity = 100 sec. 4 mm DIN 53 211 20° C.

The aforesaid paints were manufactured according to the conventional method of paint manufacture, i.e. dispersing with a dissolver, grinding in a pearl mill, adjusting the viscosity with solvents. In the manufacture of the colourless top coat paint the wax was worked in with a dissolver.

Test plates coated in this way were tested mechanically and physically according to the Coil Coating conditions:

TABLE III

| Degree of gloss | 80 units angle 60° acc. to Gardner |
| --- | --- |
| Cross-hatch adhesion test according to DIN 53 151: | Characteristic GT 0 |
| Abrasion resistance: Taber abraiser CS 17 - rollers 1000 g load 500 U: | <9.5 mg |
| Pencil hardness - Scratch hardness acc. to Wolf-Wilborn acc. to ECCA Standard: T4 | H |
| Erichsen depth acc. to DIN 53 156: | <9 mm |
| Impact test: ASTM D 2794-69 | 80 inchpound = 0.03 Nm |
| T-bend test acc. to ECCA Standard T7: T0–T0.5 free of | cracks |
| MEK test (methylethylketone): | 100 double strokes with impregnated cotton plug |

TABLE IV

| Weather-O-Meter (Atlas) | |
| --- | --- |
| Cycle | 17:3 |
| Carbon arc light: | 1000 h o.k. |
| QUV test: | 500 h 15% gloss decay slight yellowing no chalking |
| Humid room climate acc. to DIN 50 017 SK: | 1000 h o.k. |
| Kesternich acc. to DIN 50 018: | 10 rounds slight formation of patches |
| salt spray test acc. to DIN 50 021 or ASTM B 117: | 1000 h o.k. |
| water storage at 30° C. | 1000 h o.k. |

EXAMPLE 3

Aluminium sheets (DIN symbol: ALMn 1 Mg 0.5) 0.6 mm thickness, pre-treated with ACCOMET C (chromatization, Fa. Olbright & Wilson) were painted with a pigmented priming coat based on a linear, saturated, oil-free polyester resin containing hydroxyl groups in combination with melamine resin in a squeegee winding-up process (spiral squeegee) and then stoved for 30 seconds in a tunnel oven at an oven temperature of from 260° to 280° C. and a carrier material temperature (PMT) of from 230° to 240° C. The dry film thickness was between 8 and 10 μm. The paint surface obtained was smooth (without structure).

Following the same process (i.e. spiral squeegee) a top coat having aluminium bronze and based on a linear, saturated, oil-free polyester resin containing hydroxyl groups in combination with melamine resin was applied on top of the stoved priming coat and then stoved in 40 seconds in the tunnel oven at an oven temperature of from 260° to 280° C. and at a carrier material temperature resulting therefrom (PMT) of from 240° to 250° C. The top coat used contains an amount of wax which causes an even surface structure to be formed. The dry film thickness was between 10 and 20 μm, i.e. the "valleys" of the structure formed (approx. 50% of the surface) had a thickness of 5 to 10 μm, the "hills" approx. 20 to 25 μm.

|                                                                             | Parts by weight |
| --------------------------------------------------------------------------- | --------------- |
| Priming coat, smooth, black                                                 |                 |
| linear, saturated, oil-free polyester resin containing hydroxyl groups 100% | 30.0            |
| Melamine resin                                                              | 10.0            |
| Epoxy resin                                                                 | 2.0             |
| Carbon black                                                                | 2.0             |
| delustering agent                                                           | 2.0             |
| blocked p-toluol sulphonic acid                                             | 0.1             |
| aromatic hydrocarbon solvent (boiling range 185 to 210° C.)                 | 23.0            |
| aromatic hydrocarbon solvent (boiling range 230 to 290° C.)                 | 9.9             |
| ethyleneglycol monoethyletheracetate                                        | 10.0            |
| diethyleneglycol monobutyletheracetate                                      | 11.0            |
|                                                                             | 100.0           |

Running out viscosity = 100 sec. 4 mm DIN 53 211 20° C.

|                                                                        | Parts by weight |
| ---------------------------------------------------------------------- | --------------- |
| Top coat, structured, aluminium-coloured                               |                 |
| Linear, saturated, oil-free polyester resin containing hydroxyl groups | 30.0            |
| melamine resin                                                         | 12.0            |
| blocked p-toluol sulphonic acid                                        | 0.5             |
| aromatic hydrocarbon solvent (boiling range 185 to 210° C.)            | 12.0            |
| aromatic hydrocarbon solvent (boiling range 230 to 290° C.)            | 42.0            |
| diethyleneglycol monobutyletheracetate                                 | 3.0             |
| aluminium bronze                                                       | 1.0             |
| polyethylene-bis-stearylamide wax                                      | 1.5             |
|                                                                        | 100.0           |

Running out viscosity = 100 sec. 4 mm DIN 53 211 20° C.

The aforesaid paints were manufactured according to the conventional method of paint manufacture, i.e. dispersing with a dissolver, grinding in a pearl mill, adjusting the viscosity with solvents. In the manufacture of the bronzed top coat the wax was worked in with a dissolver.

Test plates coated in this way were tested mechanically and physically according to the Coil Coating conditions:

TABLE V

| Degree of gloss | 80 units angle 60° acc. to Gardner |
| --- | --- |
| Cross-hatch adhesion test according to DIN 53 151: | Characteristic 0 |
| Abrasion resistance: Taber abraser CS-17 rollers 1000 g Load 500 U | <9.5 mg |
| Pencil hardness - scratch hardness acc. to Wolf-Wilborn acc. to ECCA Standard: T4 | H |
| Erichsen depth acc. to DIN 53 156: | <9 mm |
| Impact test: ASTM D 2794-69 | 80 inchpound = 0.03 Nm |
| T-bend test acc. to ECCA Standard T7: | T0–T0.5 0.5 free of cracks |
| MEK test (methylethylketone) | 100 double strokes |

TABLE V-continued

| | with impregnated cotton plug |
|---|---|

TABLE VI

| | |
|---|---|
| Weather-O-Meter (Atlas) Cycle 6: | 17:3 |
| Carbon arc light: | 1000 h o.k. |
| QUV test: | 500 h 15% gloss decay slight yellowing no chalking |
| Humid room climate acc. to DIN 50 017 SK: | 1000 h o.k. |
| Kesterich acc. to DIN 50 018: | 10 rounds slight formation of patches |
| salt spray test acc. to DIN 50 021 or ASTM B 117: | 1000 h o.k. |
| water storage at 30° C. | 1000 h o.k. |

What is claimed is:

1. A process for roller coating a web shaped or tabular substrate, which comprises the steps of applying a composition to the substrate, said composition comprising a paint resin selected from the group consisting of polyester, polyurethane, polyacrylate, alkyd, epoxy, polyamide, polyamide imide and polysulphone resins, a liquid organic compound wherein the resin is dissolved or dispersed, and from about 0.5 to about 7 percent by weight based on the dry weight of said paint resin of particles of a polymer or wax having a particle size between 3 and 60 μm and being suspended in said liquid organic compound, the surface tension of said polymer or wax varying from that of the paint resin so that the contact angles of both during wetting with distilled water differ by at least 20°, and heating the coated substrate to a temperature sufficient to melt or cure the paint resin.

2. The process of claim 1, for applying a structured finish to a metallic substrate, including the steps of applying by roller means a base coating of paint to the metallic substrate and a top coating of paint over said base coating, wherein one of said coatings comprises said composition.

3. The process of claim 2 including the steps of applying the base coating of paint comprising said composition to the metallic substrate to form a pitted surface structure, curing the base coating, and applying a top coating of paint to said cured base coating.

4. The process of claim 2 including the steps of applying a base coating of paint to the metallic substrate, and applying a top coating of paint comprising said composition to said base coating layer.

5. The process of claim 4 wherein the base coat paint has a higher melting point than the temperature at which the top coat layer is heated.

6. The process of claim 2 including the step of melting the polymer or wax prior to melting or curing the paint resin.

7. The process of claim 6 wherein the wax of the composition is a synthetic wax.

8. The process of claim 7 wherein the synthetic wax is a material selected from polyethylene wax, polypropylene wax or polyamide wax.

9. The process of claim 8 wherein the paint resin of the composition is a saturated, oil-free polyester resin comprising hydroxyl groups.

10. A metal substrate painted according to the process of claim 1.

11. A metal substrate painted according to the process of claim 3.

12. A metal substrate painted according to the process of claim 4.

13. A metal substrate painted according to the process of claim 8.

* * * * *